United States Patent Office 3,501,502
Patented Mar. 17, 1970

3,501,502
DITHIO AMINO ALKANES
Michihiko Sakai and Masayuki Kato, Kyoto, Hikoichi Hagiwara, Osaka, and Kazuo Konishi, Kyoto, Japan, assignors to Takeda Chemical Industries, Ltd., Osaka, Japan
No Drawing. Original application June 25, 1962, Ser. No. 205,088, now Patent No. 3,318,936. Divided and this application Sept. 22, 1966, Ser. No. 612,059
Claims priority, application Japan, June 27, 1961, 36/23,009
Int. Cl. C07c 153/07; A01m 9/12
U.S. Cl. 260—347.2                    7 Claims

ABSTRACT OF THE DISCLOSURE

Compounds of the formula:

$$\begin{array}{c} CH_2-S-R \\ | \\ CH-A \\ | \\ CH_2-B \end{array}$$

wherein one of A and B is a radical of

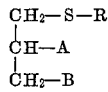

and the other radical —S—R′, and R and R′ represent a member selected from the group consisting of acetyl, benzoyl and furoyl groups, are useful as pesticides.

---

This application is a divisional application of application Ser. No. 205,088, filed June 25, 1962, now U.S. Patent 3,318,936.

This invention relates to novel compounds. More particularly, the instant invention is concerned with the new and useful compounds having in their molecule a tertiary amino group and two substituted thio groups. The compounds can be utilized as pesticides for, e.g. agricultural and sanitary purposes.

The objective compounds provided by the present invention are represented by the formulas;

$$\begin{array}{c} CH_2-S-R \\ | \\ CH-A \\ | \\ CH_2-B \end{array} \quad (I)$$

wherein one of A and B represents the group

and the other represents the group —S—R′, and R and R′ independently represent a group acetyl, benzoyl or furoyl.

It was further found by the present inventor that these novel compounds illustrated by the Formula I have a remarkable activity for killing insects, mices and nematodes, and therefore are useful for new-type pesticides.

The principal object of the instant invention is, therefore, to provide a series of novel compounds represented by the Formula I and their salts, which are useful for killing harmful animals such as insects, mites and nematodes.

Further object is to provide pesticidal compositions which can desirably be applied for agricultural and sanitary purposes to combat harmful insects including mites and nematodes, the compositions being characterized by containing one or more of the compounds represented by the Formula I including those in the form of acid salts.

These objective compounds can generally be prepared through any of the following courses.

(A) The substituted thio groups are introduced into the corresponding dihalogeno compounds. For this process, dihalogeno compounds represented by one of the Formulas IIa and IIb:

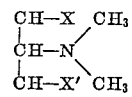    (IIa)

and

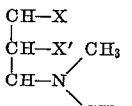    (IIb)

wherein each of X and X′ represents a halogen atom, e.g. chlorine, bromine and iodine; can be used and one of the starting compounds represented by the Formulas II is allowed to react with a reactant to replace the halogen atom attached to the hydrocarbon skeleton with the substituted thio group. As such a reactant, for example, a lower thiolcarboxylic acid (such as thiolacetic acid, thiolbenzoic acid, thiolfuroic acid or a chemical equivalent thereof) or a salt thereof (such as the sodium salt, the potassium salt, the ammonium salt, the lead salt or a chemical equivalent thereof the thiolcarboxylic acids as exemplified above) can be used.

The reaction is carried out by allowing the dihalogeno compound of either of the Formulas II to react with the thiol compound or its functional derivatives as mentioned above. Usually there is used the thiol compound or its functional derivative in an amount of not less than twice as much as the used dihalogeno compound on molar basis. When the thiol compound or its functional equivalent in about equimolar amount relative to the dihalogeno compound is used, the corresponding monosubstituted-thio monohalogeno compound is produced as a principal product, on which a similar reaction for replacing the residual halogen atom with the same or the other substituted thio group or a mercapto group is repeatedly brought about; this means is conveniently applied for producing those objective products whose two substituted thio groups are different from each other.

The reaction is preferably carried out in an appropriate solvent such as water, methanol, ethanol, propanol, acetone, methyl ethyl ketone, cyclohexanone, ether, dioxane, tetrahydrofuran, dimethylformamide, pyridine, 2-methyl-5-ethylpyridine, benzene, chloroform or a mixture of two or more kinds of these; the solvents should be selected in accordance with the kind of the used thiol compounds. Usually, the reaction can smoothly proceed at room temperature and, if desired or if required, the reaction mixture may, of course, be heated or cooled according to the progress of the reaction.

(B) The tertiary amino group

in the afore-presented Formula I is introduced into the corresponding halogeno compounds represented by one of formulas:

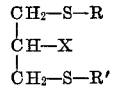    (IIa)

and

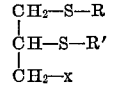    (IIb)

wherein X represents a halogen atom, e.g. chlorine, bromine and iodine. The starting halogeno compound represented by one of the Formulas III is allowed to react with dimethyl amine, or with methyl amine, and, in the latter case, followed by a further procedure of substitution of hydrogen atom in the resulting secondary amine with a halogenated hydrocarbon or with a ketone or an aldehyde and formic acid according to the so-called "Leuckart Reduction (or Reaction)." However, the reaction with the secondary amine is more advantageous than the reaction with the primary amine, since not only is there no need to carry out the subsequent reaction in the case of the former reaction, but also there is less opportunity to produce a mixture of secondary amine and tertiary amine than in the case of the latter reaction.

The reaction is carried out by allowing the halogeno compound of the Formulas III to react with the aforementioned amine in an excess of the amine or in an appropriate organic solvent such as methanol, ethanol, propanol, acetone, dioxane, dimethylformamide, tetrahydrofuran, benzene, toluene or a chemical equivalent thereof. As one mole of hydrogen halide is produced as the reaction proceeds, one further mole of the used amine may be consumed for neutralizing the produced hydrogen halide, if any other suitable alkali co-exists in the reaction mixture. Therefore, if it is desired to avoid the consumption of the used amine for the neutralizing, e.g. from the point of economical view, the procedure may be somewhat modified in such a manner that a strong alkali is gradually added to the reaction mixture containing the starting halogeno compound and about equivalent of the amine. In general the reaction can be promoted by heating at a temperature lower than 200° C. Of course, according to the kind of the used starting materials, there are cases in which the reaction can be carried out smoothly at room temperature. Moreover, the reaction may be carried out under atmospheric pressure or under superatmospheric pressure if desired, but usually it is sufficient with pressure lower than 30 atmospheres.

The compounds of the Formula I may be produced from the corresponding compound groups. The thio groups are converted into carboxylic acyl thio groups. One of the dimercapto compounds is allowed to react with an acylating agent.

As the carboxylic acylating agent, for example, a carboxylic acid (such as acetic acid, benzoic acid, furoic acid or a chemical equivalent thereof); its acid halide (such as an acid chloride, an acid bromide or an acid iodide of the carboxylic acid is exemplified above), its acid anhydride (including a homogeneous acid anhydride between two molecules of the same carboxylic acid as exemplified above; a mixed (heterogeneous) acid anhydride between the carboxylic acid as exemplified above and the other carboxylic acid as exemplified above; a mixed acid anhydride between the carboxylic acid as examplified above and a volatile acid such as carbonic acid mono ester, or an intramolecular acid anhydride when a carbon chain consisting of two or more carbon atoms is interposed between two carboxylic groups).

The reaction is generally carried out in a suitable solvent such as water, methanol, ethanol, propanol, dioxane, tetrahydrofuran, pyridine, dimethylformamide, a chemical equivalent thereof or a mixture of two or more kinds of them, and usually proceeds in an alkaline to neutral medium. Usually, the reaction can be carried out at room temperature, but it may be operated under cooling or heating when required.

By the reaction or reactions mentioned above, there can be produced the desired compounds (1) such as:

1,2-bis(benzoylthio)-3-dimethylaminopropane,
1,2-bis(furoylthio)-3-dimethylaminopropane,
1,2-bis(acetylthio)-3-dimethylaminopropane,
1,3-bis(acetylthio)-2-dimethylaminopropane,
1,3-bis(furoylthio)-2-dimethylaminopropane,
1,3-bis(benzoylthio)-2-dimethylaminopropane.

The compounds (I) are relatively strong bases owing to the tertiary amino group, and form stable acid addition salts. The compounds (I) can be obtained and utilized in the form of acid addition salts as well as in the free form. The acid which can be used to prepare the acid addition salt is suitably selected from those which produce, when combined with the compounds (I) in the form of free bases, addition salts whose anions do not lessen the pesticidal properties inherent in the free bases. Appropriate acid addition salts are, for example, those derived from inorganic acids such as hydrochloric, hydrobromic, hydroiodic, chloric, bromic, iodic, perchloric, perbromic, periodic, sulfuric, nitric, phosphoric and arsenic acids, and from organic acids such as maleic, citric, tartaric, oxalic, benzenesulfonic, toluenesulfonic, ethanesulfonic, picric acids or those derived from alkylhalides such as methyl iodide, ethyl iodide, etc.

As briefly stated hereinbefore, the novel compounds thus prepared were found to show activity for killing lower animals such as insects, mites or nematodes, but not to show so much toxicity for vertebrates including mammals and fowls or for plants. Owing to these characteristic properties, the compounds are used as main components for pesticides, especially for insecticides.

When the compounds are brought into practice as pesticides for agricultural and sanitary purposes, the compounds are generally processed so as to fit the intended purposes to form compositions, for example, wettable powder, solution, emulsifiable solution, dust or aerosol.

For the preparation the compositions, a variety of adjuvants may be employed. One or more of the compounds are dissolved or dispersed in an appropriate liquid adjuvant when used as solution, emulsifiable solution or aerosol. As the liquid adjuvant to be used as solvents, for example, water, lower alcohols (such as methanol, ethanol, isopropanol, butanol, glycerol or ethylene glycol), ketones (such as acetone, methyl ethyl ketone, cyclohexanone or cyclopentanone), ethers (such as dioxane, tetrahydrofuran, ethylene glycol monomethyl ether or diethylene glycol monomethyl ether), aliphatic hydrocarbons (such as n-hexane, gasoline, kerosene, fuel oil, lubricating oil or machine oil); aromatic hydrocarbons (such as benzene, toluene, xylene, solvent naphtha or methyl naphthalene), essential oils, terpones, chlorinated biphenyl or cottonseed oil can be used. The solvent is often used in a mixture of the solvents as exemplified above, since the solvent to be used is desired to be not only excellent in its solubility but also less toxic for plants or human bodies.

For preparing dust composition of the compounds, there are usually employed dust diluents or carriers. One or more of the compounds are finely pulverized, for example, in a ball mill, edge runner or impact pulverized, and the thus pulverized compounds are admixed with dust diluents or carriers. As the diluents or the carriers, for example, vegetable powder (such as soybean flour, wheat flour, tobacco powder, walnut flour or saw dust), clay (such as kaolin kaolinite, saponite, vermiculite, beidellite, montmorillonite—bentonite or Fuller's earth—or attapulgite), talc, pyrophyllite, calcium lime, magnesium lime, diatomaceous earth, silica, hydroxyapatite, calcium carbonate, dolomite, calcite, calcium sulfate, hydrated alumina, carbon black or sulphur can be used.

Another kind of adjuvant is surface active agent which is used as sticking or developing agent, emulsifier, or solubilizer for improving the effect or the stability of compositions. Among commercially available surface active agents, salts of sulfonated castor oil, salts of alkyl aryl sulfonates or non-ionic surfactants such as polyoxyethylene diaryl ether, polyoxyethylene sorbitan monoacrylate (the acyl group having 10 to 18 carbon atoms) are preferbaly used as emulsifying and solubilizing agents for the compositions.

The pesticidal compositions may contain other pesticides (such as benzenehexachloride (BHC), dichlorodiphenyltrichloroethane (DDT), aldrin, dieldrin, endrin, pyrethrin, rotenone, parathion or the other oragnic phosphorus poisons), acaricides, nematocides, fungicides, herbicides, attractants or repellents. They may also contain growth hormones, fertilizers, or perfumes, all these additions being considered the adjuvants in the compositions of the instant invention.

The compounds (I) or compositions thereof of the present invention were observed to have the effect to kill a wide variety of insects, mites and nematodes, and exterminate those harmful animals as exemplified below or as least lessen remarkably the number of surviving animals: The examples of plant feeding insects etc. are:

Colorado potato beetle (*Leptinotaran decomlineata*),
Large 28-spotted lady bettle (*Epilachna vigintioctomanculata*),
28-spotted lady beetle (*Epilachna sparsa orientalis*),
Striped flea beetle (*Phyllotrata atriolata*),
Cucurbit leaf beetle (*Aulacophora femoralis*, adult),
Grape leaf beetle (*Acrothinium gackkwitchii*, adult),
Red bean beetle (*Callosobruchus chinensis*),
German cockroach (*Blattela germanica*),
Rice leaf beetle (*Lema orysae*),
House fly (*Musca domestica*),
Cabbage sawfly (*Athalia rosae japonensis*, larva),
Rice stem borer (*Chilo suppressalis*),
Tobacco cutworm (*Plodenia litura*),
Rice plant skipper (*Parara guttata*, larva),
Rice green caterpillar (*Naranga aenescans*, larva),
Cabbage armyworm (*Barathra brassicae*, larva),
Giant bagworm (*Crypothelea formesicola*, larva),
Pea bagworm (*Cryptothelea minuscula*, larvae),
Pale clouded yellow (*Colias hyale poliographus*, larvae),
Cabbage worm (*Pieris rapae*, larva),
Citrus red mite (*Petranychus citri*),
Soybean aphid (*Aphis glycines*),
Turnip aphid (*Rhapalosiphum pseudobrassicae*),
Two-spitted mite (*Tetranychus bimaculatus*), etc.

Compositions for direct application to vegetation may contain from 0.1% to 10% or more of the compound(s) (I) by weight. When the composition is designed as a concentrate for preparation of sprays or more dilute dusts, the contents of the compound(s) (I) may vary from 10% to 90% by weight.

The pesticidal activity of the compounds (I) is illustrated with reference to a typical representative of experiments.

EXPERIMENT 1

The test compound was dissolved in tap water containing 0.02% of a sticking agent, so as to adjust the concentration of the test compound as illustrated in Table 1. As the sticking agent, the composition consisting of 20% of alkyphenol polyethylene glycol ether, 12% of lignin sulfonic acid and 68% of aqueous methanol was added. Young leaves of Chinese cabbage were immersed in the thus improved test solution for several seconds and the wet leaves were allowed to stand in air until the surface of the leaves dried. The leaves thus treated were placed in the pots of 9 centimeters in diameter and 3 centimeters in height. Test insects, i.e. cabbage worms (*Piersis rapae*, larvae) or striped flea beetles (*Phyllotreta striolata*, adults), were set free on the leaves. After 24 hours, the number of killed insects were respectively counted. Results are shown in Table 1.

TABLE 1

| Test compound | Cabbage worms | | Striped flea beetles | |
| --- | --- | --- | --- | --- |
| | Concentration of test compound (percent) | Killed/used | Concentration of test compound (percent) | Killed/used |
| 1,2-bis(acetylthio)-3-dimethylaminopropane hydrogen oxalate | | | 0.02 | 19/20 |
| Control | 0 | 0/8 | 0 | 0/20 |

EXPERIMENT 2

The droplets from 1 ml. of pipetted aqueous solution of the test compounds were dropped into a Petri dish until the droplets covered homogeneously the bottom of the dish. After the droplets were dried by airing gently, red bean beetles (*Callosobruchus chinensis*) were set free in the Petri dish. 24 hours later, the number of killed insects was counted to calculate the lethan concentration ($LC_{50}$).

TABLE 2

| Test compound | Lethal concention ($LC_{50}$), percent |
| --- | --- |
| 1,3-bis(propyldithio)-2-dimethylaminopropane hydrogen oxalate | 0.005-0.01 |
| 1,3-dimercapto-2-dimethylaminopropane hydrogen oxalate | 0.001 |

The following examples set forth presently-preferred illustrative typical compounds represented by the Formulas I of the invention and of the procedure for their preparation, and will serve to make apparent the compounds embraced by the Formlas I and their preparation respectively. It will be understood, of course, that the invention is not limited to the particular details of these examples since they are no more than examples of some preferred embodiments of the invention. In these examples and exemplary compositions, temperatures are uncorrected and shown in degrees centigrade. The abbreviation "ml." means "milliliter" or "milliliters," and respective amounts of materials shown by either of "part(s)" or "percent" are on weight basis.

Example 1

In 150 ml. of ethanol was neutralized 4.8 grams of 1,3-dichloro-2-dimethylaminopropane hydrochloride with 1.4 grams of potassium hydroxide. To the solution was added gradually 5.2 grams of potassium thiolacetate under agitation at room temperature. After the addition, the mixture was warmed for a little while to separate out potassium chloride, which was then filtered off. The filtrate was concentrated under reduced pressure to leave an oily substance, which was extracted with ether. The ethereal solution was washed with water, dried on anhydrous sodium sulfate and warmed to distill off the ether to leave an oily substance. The oily residue was dissolved in dry ether and an ethereal solution saturated with anhydrous oxalic acid was added gradually to the ethereal solution to separate out crystals, which were recrystallized from a mixture of ethanol and ether to obtain 1,3-bis(acetylthio)-2 - dimethylaminopropane hydrogen oxalate as colorless crystals melting at 91°–94°.

Example 2

A solution of 12.5 grams of 1,2-dichloro-3-dimethylaminopropane hydrochloride in 100 ml. of ethanol was neutralized with 3.6 grams of potassium hydroxide, whereupon potassium chloride separated and was filtered. To the filtrate was added an ethanolic solution of sodium thiolacetate which had been prepared from 9.9 grams of thioacetic acid, 3 grams of metallic sodium and 100 ml.

of ethanol. The mixture was allowed to stand overnight and was refluxed on the water bath for 40 minutes, whereupon sodium chloride separated and was filtered off. The filtrate was concentrated under reduced pressure to dryness and the oily residue was dissolved in ether. The ethereal solution was washed with water, and dehydrated. An ethereal solution saturated with anhydrous oxalic acid was added dropwise to the dehydrated ethereal solution to separate crystals, which were collected by filtration to obtain 6 grams of 1,2-bis(acetylthio)-3-dimethylaminopropane hydrogen oxalate, which decomposes at about 105°–115°. The crude crystals were recrystallized from methanol to give pale yellow crystals decompositing at 124°–128°.

Example 3

Eighty grams of gaseous ammonia was dissolved in 1.2 liters of anhydrous methanol under cooling and then hydrogen sulfide was saturated therein. To the solution was added 80 grams of 1,2-dibromo-3-dimethyl-aminopropane hydrochloride and the mixture was allowed to stand overnight in a sealed vessel at room temperature. Then, the mixture was boiled for 2 days, while introducing hydrogen sulfide therein. Resulting crystals were filtered off and the filtrate was concentrated under reduced pressure to leave an oily residue, which was further distilled to obtain 6.0 grams of 1,2-dimercapto-3-dimethylaminopropane, boiling at 71°–78°/5 mm. Hg.

Example 4

A solution of 3 grams of 1,2-dimercapto-3-dimethylaminopropane in 30 ml. of water was adjusted pH 9.0 with 10% aqueous sodium hydroxide solution and saturated with sodium chloride. A solution of 6 grams of sodium benzylthiolsulfate in 20 ml. of water was added to the solution saturated with sodium chloride under agitation, whereupon an oily substance separated, which was extracted three times with 30 ml. each of ethereal. The ethereal extracts were combined and mixed with 25 ml. of 7%-aqueous oxalic acid solution. The mixture was shaken and allowed to stand overnight to allow the objective compound to crystallize, which was filtered and recrystallized to obtain 2 grams of 1,2-bis(benzyldithio)-3-dimethylaminopropane hydrogen oxalate as colorless crystals melting at 115°.

Example 5

A mixture of 40 ml. of anhydrous ethanol and 80 ml. of liquid ammonia was cooled with Dry Ice. A solution of 4.6 grams of 1,3-bis(benzylthio)-2-dimethylaminopropane in 40 ml. of anhydrous ethanol and 1.9 grams of metallic sodium were alternatively added to the cooled mixture with stirring to allow the reaction to take place. After the reaction ended, ammonia and ethanol were distilled off. The oily residue was dissolved in 50 ml. of water and the solution was extracted with ether to remove oily substances insoluble in water. The aqueous layer was separated and 6.2 grams of benzoyl chloride was dropped into the separated solution under ice-cooling and agitation. After 30 minutes from the end of the addition, oily substance separating was extracted with 80 ml. of ether. The ethereal extract was mixed with 25 ml. of 7%-aqueous solution of oxalic acid. The mixture was shaken and allowed to stand overnight, whereupon the objective compound crystallized, which was filtered and dried to give 2.1 grams of 1,3-bis(benzoylthio)-2-dimethylaminopropane hydrogen oxalate as white leaflet crystals melting at 154°–156°.

Example 6

1,3-dimercapto-2-dimethylaminopropane, which had been prepared from 4.6 grams of 1,3-bis(benzylthio)-2-dimethylaminopropane in the same manner as in the preceding example, was dissolved in 50 ml. of water, and 6.5 grams of furoyl chloride was dropped into the aqueous solution. After 30 minutes from the end of the addition, oily substance separating was extracted with 80 ml. of ether. The ethereal extract was mixed with 25 ml. of 7%-aqueous solution of oxalic acid. The mixture was shaken and allowed to stand overnight, whereupon the objective compound crystallized, which was filtered and dried to give 2.5 grams of 1,3-bis(furoylthio)-2-dimethylaminopropane hydrogen oxalate as white crystals melting at 152°–158°.

Example 7

Into a solution of 2.1 grams of 1,2-dimercapto-3-dimethylaminopropane and 3.2 grams of sodium hydroxide in 50 ml. of water was dropped 6.2 grams of benzoyl chloride under ice-cooling and agitation. After 30 minutes from the end of the addition, oily substance separating was extracted with 80 ml. of ether. The ethereal extract was mixed with 25 ml. of 7%-aqueous solution of oxalic acid. The mixture was shaken and allowed to stand overnight, whereupon the objective compound crystallized, which was filtered and dried to obtain 2.1 grams of 1,2-bis(benzoylthio)-3-dimethylaminopropane hydrogen oxalate as white leaflet crystals melting at 154°–156°.

Example 8

Into a solution of 2.1 grams of 1,2-dimercapto-3-dimethylaminopropane and 3.2 grams of sodium hydroxide in 50 ml. of water was dropped 6.5 grams of furoyl chloride under ice-cooling and agitation. After 30 minutes from the end of the addition, oily substance separating was extracted with 80 ml. of ether. The ethereal extract was mixed with 25 ml. of 7%-aqueous solution of oxalic acid. The mixture was shaken and allowed to stand overnight, whereupon the objective compound crystallized, which was filtered and dried to give 2.5 grams of 1,2-bis(furoylthio)-3-dimethylaminopropane hydrogen oxalate as white crystals melting at 152°–158°.

Example 9

A solution of 2.7 grams of 1,2-dimercapto-3-dimethylaminopropane and 4.2 grams of sodium hydroxide in 70 ml. of water was saturated with sodium chloride, and 8 grams of acetic anhydride was dropped into the aqueous solution under ice-cooling and agitation. Then, after adding 80 ml. of ether thereto, the mixture was agitated for additional 30 minutes. The ether layer was separated, dried and mixed with the ethereal solution saturated with oxalic acid. The mixture was shaken and allowed to stand overnight, whereupon the objective compound crystallized, which was filtered and dried to obtain 5 grams of 1,2-bis(acetylthio)-3-dimethylaminopropane hydrogen oxalate as white powdery crystals melting at 115°–116° C.

Example 10

One gram of 4-dimethylaminomethyl-2-phenyl-1,3-dithiolane was dissolved in a mixture of 20 ml. of ether and 50 ml. of liquid ammonia. To the solution under agitation was added 0.5 gram of metallic lithium bit by bit, whereupon the reaction mixture turned to deep blue in color. The blue color disappeared upon adding 5 ml. of ethanol to the mixture after the reaction had ended. The solvent was distilled off and the residue was dissolved in ice-water. The solution was extracted with ether. The ether layer was separated from the aqueous layer. The ethereal extract was dehydrated and mixed with an ethereal solution of oxalic acid to separate 0.5 grams of crystals, which were recrystallized from ethanol to give 4-dimethylamino-1,2-dithiolane hydrogen oxalate melting at 169°–170° with decomposition.

The aqueous layer separated from the ethereal extract was alkalified. Benzoyl chloride was added to the alkaline aqueous solution to allow the reaction to take place. The reaction mixture was extracted with ether and the ethereal extract was processed in an ordinary manner to give 0.4 gram of 1,2 - bis(benzoylthio)-3-dimethylaminopropane hydrogen oxalate which melts 156° with decomposition.

Instead of the metallic lithium above-used in this example, 1 gram of metallic sodium was used to carry out the reaction with the essentially same result as mentioned above.

Example 11

One gram of 4-dimethylaminomethyl-2-phenyl-1,3-dithiolane was dissolved in a mixture of 20 ml. of ether and 50 ml. of liquid ammonia. To the solution under agitation, 0.5 gram of metallic lithium was added, whereupon the reaction mixture turned to deep blue in color. After 6 ml. of ethanol was gradually added to the reaction mixture, the solvent was distilled off under reduced pressure. The residue was dissolved in water and the solution was extracted with ether. An ethereal solution of oxalic acid was added to the ethereal extract separated from the aqueous layer to give 0.4 gram of 4-dimethylamino-1,2-dithiolane hydrogen oxalate, melting at 169° with decomposition.

Benzoyl chloride was added to the alkaline aqueous layer separated from the ethereal extract and the reaction mixture was treated in the same way as in the preceding example to obtain 0.3 gram of 1,2-bis(benzoylthio)-3-dimethylaminopropane hydrogen oxalate, melting at 156° with decomposition.

Having thus disclosed the invention, what is claimed is:
1. A compound of the formula

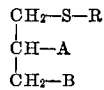

wherein one of A and B is a radical

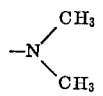

an the other, a radical —S—R', and R and R' represent a member selected from the group consisting of acetyl, benzoyl and furoyl groups.
2. 1,2-bis(acetylthio)-2-dimethylaminepropane.
3. 1,2-bis(acetylthio)-3-dimethylaminopropane.
4. 1,3-bis(benzoylthio)-2-dimethylaminopropane.
5. 1,3-bis(furoylthio)-2-dimethylaminopropane.
6. 1,2-bis(benzoylthio)-3-dimethylaminopropane.
7. 1,2-bis(furoylthio)-3-dimethylaminopropane.

References Cited

UNITED STATES PATENTS 2,212,895   8/1940   Allen.
2,381,483   8/1945   Blake et al.
3,318,938   5/1967   Haynes.

OTHER REFERENCES

Yurugi et al., Chemical Abstracts, vol. 62, col. 7773a (1965).

ALEX MAZEL, Primary Examiner

B. I. DENTZ, Assistant Examiner

U.S. Cl. X.R.

260—455; 424—285, 335